Dec. 1, 1964  H. A. DUVALL  3,159,771
ELECTRICAL PANELBOARD
Filed Nov. 15, 1961  2 Sheets-Sheet 1
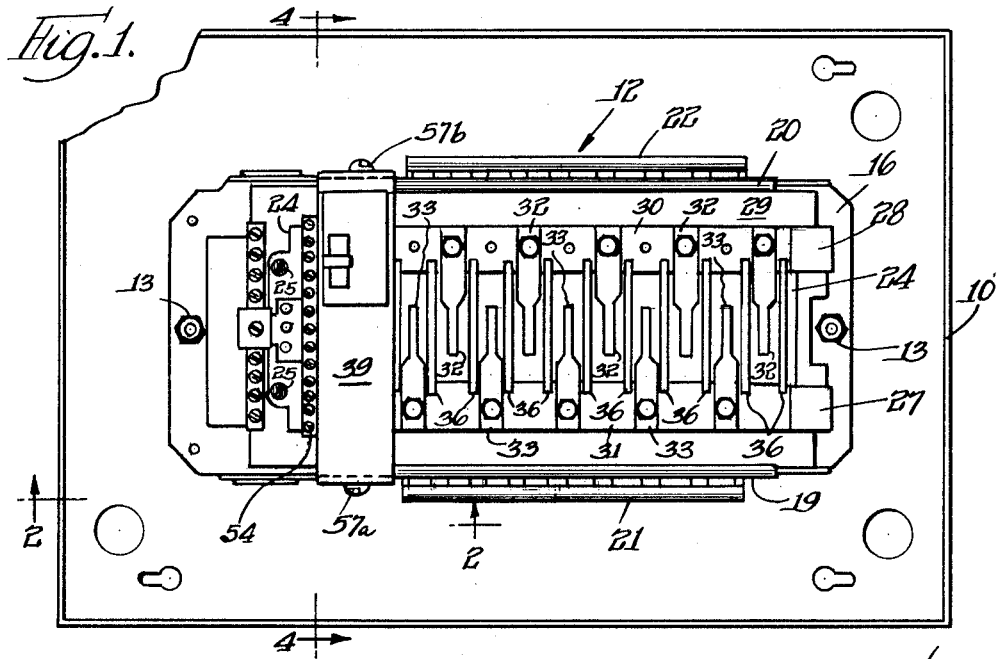
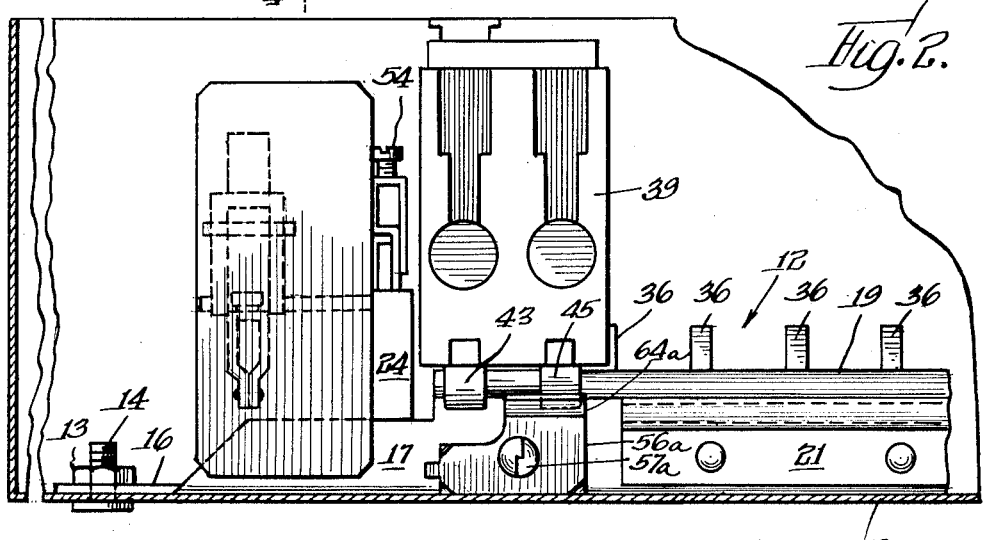
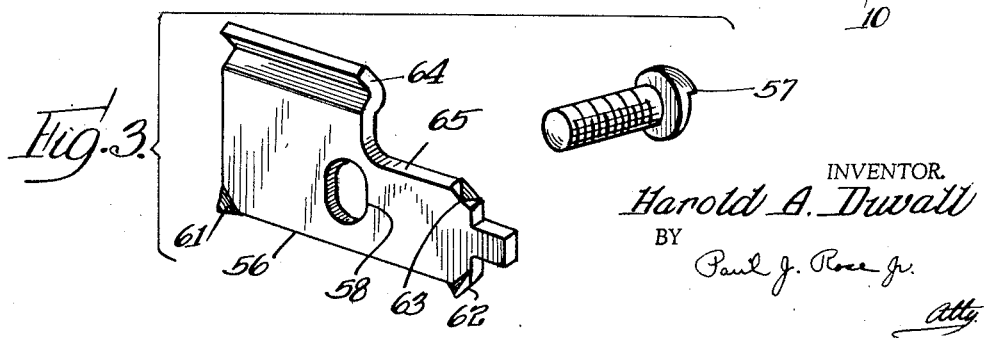
INVENTOR.
*Harold A. Duvall*
BY
*Paul J. Rose Jr.*
Atty.

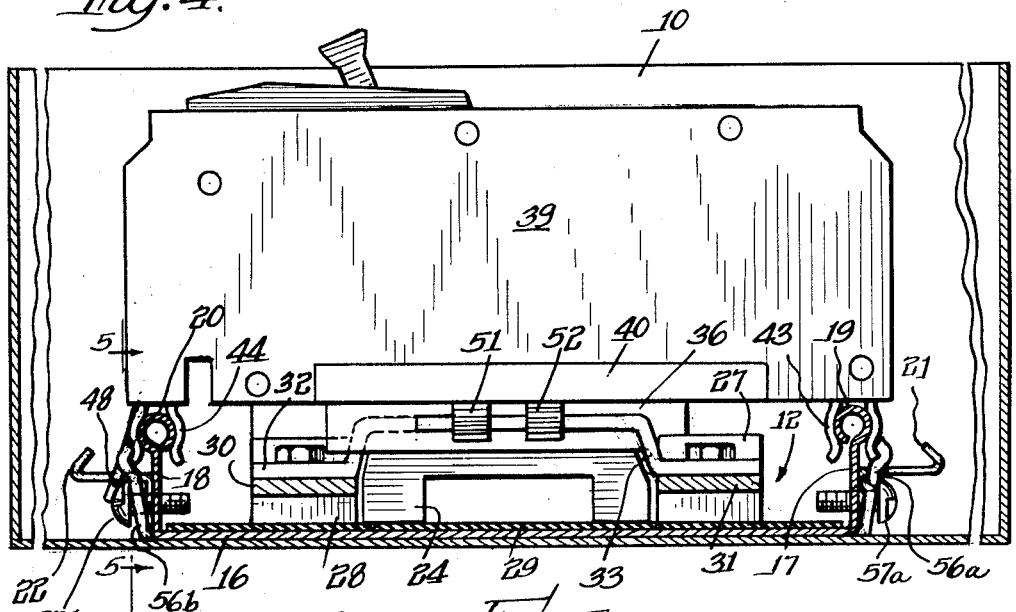
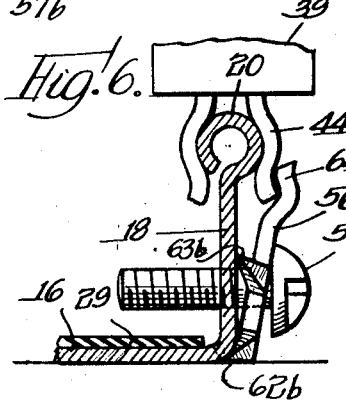
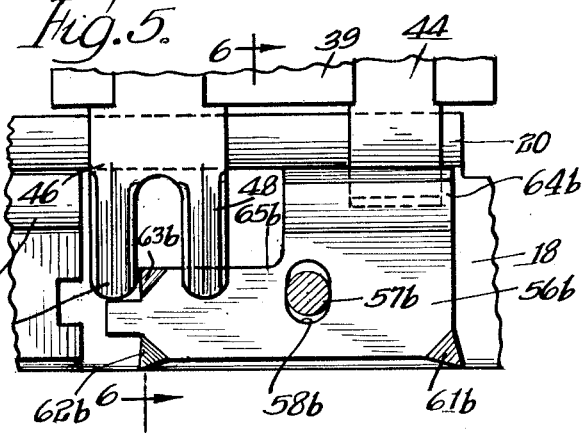
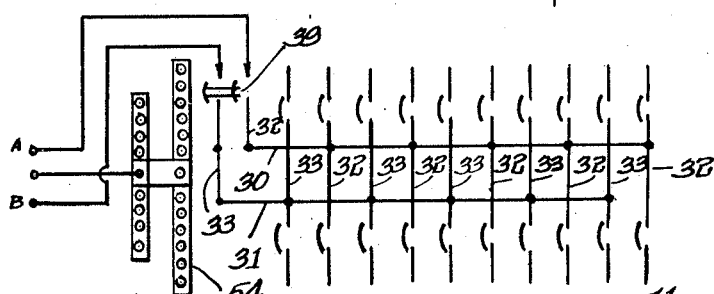

3,159,771
ELECTRICAL PANELBOARD
Harold A. Duvall, Pasadena, Calif., assignor to Square D Company, Park Ridge, Ill., a corporation of Michigan
Filed Nov. 15, 1961, Ser. No. 152,417
10 Claims. (Cl. 317—119)

This invention relates generally to electrical panelboards. An object of the invention is to provide a fastening means whereby an electrical circuit breaker of the plug-in type may be secured in an acceptable manner to a mounting panel assembly of a panelboard for use as a main circuit breaker, i.e., a circuit breaker that controls the power supply to all branch circuits fed from the panelboard. Safety requires that a main circuit breaker should be readily removable from a panelboard by unauthorized persons who might be tempted to connect the line wires directly to the bus bars and replace the main circuit breaker with a plurality of additional branch circuit breakers.

Other objects of the invention will become apparent when the following specification is considered in conjunction with the accompanying drawings wherein:

FIGURE 1 is a front view of a panelboard embodying my invention, the front trim and door assembly being removed;

FIGURE 2 is a fragmentary side view of the mounting panel assembly taken along the section line 2—2 through the enclosure box as indicated in FIGURE 1;

FIGURE 3 is a perspective view of a fastening bracket constructed in accordance with my invention, a screw for securing the bracket to the pan of the mounting panel assembly also being shown;

FIGURE 4 is a sectional view through the panelboard taken along the section line 4—4 of FIGURE 1;

FIGURE 5 is a fragmentary view taken substantially along the line 5—5 of FIGURE 4, the screw being shown in section;

FIGURE 6 is a fragmentary sectional view taken substantially along the line 6—6 of FIGURE 5; and FIGURE 7 is a wiring diagram for the panelboard.

The panelboard includes an enclosure box 10 having a mounting panel assembly 12 secured to the inner side of the back wall thereof by means of nuts 13 threaded on studs 14 extending into the box 10 through the back wall.

The mounting panel assembly 12 includes a pan 16 having a hole at each end for receiving one of the studs 14 and having upturned side edges 17 and 18 provided with rolled-over upper ends forming continuous beads 19 and 20, respectively. The upturned side edges 17 and 18 have rejection members 21 and 22 rivetted respectively thereto. For a more complete description of the rejection members 21 and 22, reference may be had to United States Patent No. 3,065,386, issued to Robert E. King and Harris I. Stanback on November 20, 1962, and assigned to the assignee of the present invention.

A base member 24 formed of an insulative material is secured at one end to the pan 16 by a pair of screws 25 and extends longitudinally along the pan, the other end being located between a pair of insulating blocks 27 and 28 secured to the pan 16 by screws (not shown). Further insulation is provided by an insulative sheet 29 interposed between base member 24, blocks 27 and 28, and the pan 16.

The base member 24 and the blocks 27 and 28 are provided with slots (not shown) for receiving the ends of a pair of transversely spaced bus bars 30 and 31 which are suspended above the insulative sheet 29. Several spaced connectors 32 are secured to the bus bar 30 and extend toward the bus bar 31, and the bus bar 31 has secured thereto several like or similar connectors 33 extending toward the bus bar 30 between the connectors 32. The base member 24 has a plurality of upstanding partitions 36 extending between the bus bars 30 and 31 and separating the connectors 32 and 33.

A two-pole circuit breaker 39, which, by way of example, may have an alternating current rating of one hundred amperes at two hundred forty volts, is mounted on the mounting panel assembly 12 for use as a main circuit breaker. The case of the circuit breaker 39 is recessed between poles in a manner not shown to receive one of the upstanding partitions 36, and opposite sides of the case of the circuit breaker 39 are recessed as indicated by numeral 40 in FIGURE 4, the recesses 40 being of a depth substantially equal to one-half the thickness of a partition 36 so that a partition 36 may be received between two such circuit breakers when a plurality are used in the normal manner on a panelboard to protect and control individual branch circuits.

The circuit breaker 39 is provided at opposite ends with a pair of spring clips, these clips being identified in the drawings by the numerals 43, 44, 45, and 46 and being adapted to snap over one of the beads 19 and 20 to mechanically support the circuit breaker 39 on the mounting panel assembly 12. The clips 43 and 45 are shown mounted on the bead 19 and the clips 44 and 46 are shown mounted on the bead 20, although the breaker could also be mounted with the clips 43 and 45 on the bead 20 and the clips 44 and 46 on the bead 19. Each clip has a pair of jaws, and the outer jaw of the clip 46 is provided with two extending prongs 47 and 48 which have no function when the circuit breaker 39 is used as a main circuit breaker, but which would interfere with one of the rejection members 21 and 22 if an attempt were made to mount the circuit breaker 39 at a different location on the panelboard unless two adjacent scored portions of one of rejection members 21 and 22 were first displaced, as explained in the aforesaid pending application.

Each pole of the circuit breaker 39 is provided with a pair of split or dual contact jaws each adapted to mechanically and electrically engage one of the connectors 32 and 33. In FIGURE 4 portions 51 and 52 of one contact jaw of one pole are shown engaging one side of a connector 33. It will be understood that corresponding portions of the other contact jaw engage the other side of this connector 33 and that a corresponding pair of split or dual contact jaws of the other pole of the circuit breaker 39 engages the adjacent connector 32 on the other side of the partition 36.

A neutral bar assembly 54 is mounted on a raised portion of the base member 24 at the end thereof adjacent the circuit breaker 39.

Each of the ten connectors 32 and 33 remaining after installation of the main circuit breaker 39 is adapted to have two smaller one hundred twenty volt circuit breakers connected thereto as shown in the aforesaid pending application, so that two rows of ten circuit breakers each may be installed on the mounting panel assembly 12 to handle a total of twenty branch circuits, it being understood that provision may be made for a greater or lesser number as desired. FIGURE 7 shows a wiring diagram for such a panelboard, the bus bars 30 and 31, the connectors 32 and 33, the main circuit breaker 39, and the neutral bar assembly 54 being shown schematically and identified therein. Power lines A and B are connected to the same lugs (not shown) as the load lines would be connected to if the circuit breaker 39 were installed on a panelboard in the usual manner to protect a single two hundred forty volt branch circuit.

In order that the circuit breaker 39 may not be readily unplugged from the beads 19 and 20 and connectors 32 and 33 and removed from the panelboard, a pair of brackets 56a and 56b and screws 57a and 57b identical to a bracket 56 and screw 57, respectively, shown in FIGURE 3, are provided.

The bracket 56 has an aperture 58 therethrough adapted to receive the screw 57, which may be a one-way screw. Three gripping teeth 61, 62 and 63 are provided on the bracket 56. The upper portion of the bracket is reversely bent as at 64 and cut away as at 65.

The bracket 56a is secured to the upturned side edge 17 of the pan 16 by the screw 57a and the upper portion 64a bears against the outer jaw of the clip 45 as shown in FIGURE 2 to hold it tightly against the bead 19. The bracket 56b is secured to the upturned side edge 18 of the pan 16 by the screw 57b and the upper portion 64b bears against the outer jaw of the clip 44 as shown in FIGURES 5 and 6 to hold it tightly against the bead 20. The prongs 47 and 48 of the clip 46 are able to clear the bracket 56b because its upper portion is cut away at 65b. With the brackets 56a and 56b thus in place, the main circuit breaker 39 cannot be unplugged from the beads 19 and 20 and the connectors 32 and 33, and the brackets 56a and 56b cannot be loosened without first removing the mounting panel assembly 12 from the box 10. An unauthorized person would not likely attempt to do this.

If desired, ordinary screws could be used in place of the one-way screws 57a and 57b, and the brackets 56a and 56b still could not be loosened very readily due to the proximity of the screws to the side walls and back wall of the box 10.

Various modifications may be made in the structure disclosed without departing from the spirit and scope of the invention.

I claim:
1. An electrical panelboard comprising:
 (a) a box including a back portion,
 (b) a mounting panel assembly for plug-in type electrical circuit breakers, said mounting panel assembly being removably secured within said box to said back portion thereof,
 (c) said mounting panel assembly including a pan having a pair of upturned opposite side edges provided with rolled-over upper ends forming beads,
 (d) an electrical circuit breaker of the plug-in type removably mounted on said mounting panel assembly for use as a main circuit breaker,
 (e) said circuit breaker having a pair of opposite ends each having an adjacent spring clip provided with inner and outer jaws resiliently clamped on one of said beads, and
 (f) a pair of bracket means respectively removably secured to said side edges of said pan in engagement with said outer jaws of said spring clips to secure said clips to said beads and thereby secure said circuit breaker to said mounting panel assembly, said pair of bracket means being accessible to release said removably mounted circuit breaker only after first removing said mounting panel assembly from said box.

2. An electrical panelboard as claimed in claim 1, wherein said pair of bracket means each has a gripping tooth engaged with an upturned side edge of said pan.

3. An electrical panelboard as claimed in claim 1, wherein said pair of bracket means each has a reversely bent upper portion engaged with an outer jaw of one of said spring clips below the center of the respective bead.

4. An electrical panelboard as claimed in claim 1, wherein said circuit breaker is a two-pole circuit breaker and each pole has a pair of spring clips respectively adjacent opposite ends thereof and wherein one of said bracket means is engaged with a spring clip on one end of one pole of said two-pole circuit breaker and the other of said bracket means is engaged with a spring clip on the other end of the other pole of said two-pole circuit breaker.

5. An electrical panelboard as claimed in claim 4, wherein one of said spring clips is provided with a pair of extending prongs on an outer jaw thereof and one of said bracket means is cut away at an upper portion to clear said prongs.

6. An electrical panelboard comprising:
 (a) a box including a back portion,
 (b) a mounting panel assembly for plug-in type electrical circuit breakers and, said mounting panel assembly being removably secured within said box to said back portion thereof,
 (c) said mounting panel assembly including a pan having an upturned side edge provided with a rolled-over upper end forming a bead,
 (d) an electrical circuit breaker of the plug-in type removably mounted on said mounting panel assembly for use as a main circuit breaker,
 (e) said circuit breaker having adjacent one end a spring clip including a pair of jaws resiliently clamped on said bead, and
 (f) bracket means removably secured to said side edge of said pan in engagement with one of the jaws of said spring clip to secure said clip to said bead and thereby secure said circuit breaker to said mounting panel assembly, said bracket means being accessible to release said removably mounted circuit breaker only after first removing said mounting panel assembly from said box.

7. An electrical panelboard as claimed in claim 6, wherein said bracket means has a gripping tooth engaged with said side edge of said pan.

8. An electrical panelboard as claimed in claim 6, wherein said bracket means has a reversely bent upper portion engaged with a jaw of said spring clip below the center of said bead.

9. An electrical panelboard comprising:
 (a) a box including a back portion,
 (b) a mounting panel assembly for plug-in type electrical circuit breakers, said mounting panel assembly being removably secured within said box to said back portion thereof,
 (c) said mounting panel assembly including a mounting pan having a pair of upturned opposite side portions,
 (d) an electrical circuit breaker of the plug-in type removably mounted on said mounting panel assembly for use as a main circuit breaker,
 (e) said circuit breaker having a pair of mounting clips respectively adjacent opposite end portions, each of said mounting clips having a portion disposed outwardly of a respective one of said side portions of said mounting pan in overlapping relationship thereto, and
 (f) a pair of clamping means accessible only after said mounting panel assembly is removed from said box, said clamping means being removably secured respectively to said side portions of said mounting pan to clamp said portions of said mounting clips respectively therebetween.

10. An electrical panelboard comprising:
 (a) a box including a back portion,
 (b) a mounting panel assembly for plug-in type electrical circuit breakers, said mounting panel assembly being removably secured within said box to said back portion thereof,
 (c) said mounting panel assembly including a mounting pan having an upturned side portion,
 (d) an electrical circuit breaker of the plug-in type removably mounted on said mounting panel assembly for use as a main circuit breaker, (e) said circuit breaker being provided with a mounting clip having a portion disposed outwardly of said side portion of said mounting pan in overlapping relationship thereto, and (f) clamping means accessible only after said mounting panel assembly is removed from said box, said clamping means being removably secured to said side portion of said mounting pan to clamp said portion of said mounting clip therebetween.

References Cited in the file of this patent

UNITED STATES PATENTS

| | | |
|---|---|---|
| 2,443,996 | Tenney | June 22, 1948 |
| 2,530,548 | Stanley | Nov. 21, 1950 |
| 2,851,538 | Jackson | Sept. 9, 1958 |
| 2,902,632 | Stanback et al. | Sept. 1, 1959 |
| 2,942,157 | Davis | June 21, 1960 |
| 3,089,063 | Mittendorf et al. | May 7, 1963 |
| 3,093,773 | Cole | June 11, 1963 |